United States Patent [19]

Inman et al.

[11] Patent Number: 5,421,144
[45] Date of Patent: * Jun. 6, 1995

[54] BALE SHEATHING METHOD AND APPARATUS

[75] Inventors: Larry Inman, Warrenton; Mike Koskela, Astoria, both of Oreg.; Walter L. Jay, Blair, Nebr.

[73] Assignee: Ag-Bag Corporation, Warrenton, Oreg.

[*] Notice: The portion of the term of this patent subsequent to Jun. 22, 2010 has been disclaimed.

[21] Appl. No.: 263,548

[22] Filed: Jun. 22, 1994

Related U.S. Application Data

[63] Continuation of Ser. No. 882,690, May 11, 1992, Pat. No. 5,323,591, which is a continuation-in-part of Ser. No. 760,701, Sep. 16, 1991, Pat. No. 5,220,772.

[51] Int. Cl.⁶ ............................................. B65B 43/26
[52] U.S. Cl. ..................... 53/576; 53/384.1; 53/567; 53/570
[58] Field of Search ............... 56/218, 228; 53/384.1, 53/459, 469, 567, 576, 570, 585

[56] References Cited

U.S. PATENT DOCUMENTS

| | | |
|---|---|---|
| 3,473,291 | 10/1969 | Raymond et al. |
| 4,337,805 | 7/1982 | Johnson et al. |
| 4,470,241 | 9/1984 | Parry et al. ............... 53/585 X |
| 4,480,536 | 11/1984 | Burns ........................ 53/585 X |
| 4,558,560 | 12/1985 | Koch . |
| 4,606,176 | 8/1986 | Cundall . |
| 4,686,817 | 8/1987 | Brodrecht et al. |
| 4,771,510 | 9/1988 | Kawai ........................ 53/567 X |
| 4,793,124 | 12/1988 | Anderson . |
| 4,888,937 | 12/1989 | Glenn . |
| 4,938,006 | 7/1990 | Korsgaard . |
| 4,945,715 | 8/1990 | Brodrecht . |
| 5,003,754 | 4/1991 | Stirling . |
| 5,016,424 | 5/1991 | Stirling . |
| 5,220,772 | 6/1993 | Koskela et al. |
| 5,323,591 | 6/1984 | Inman et al. ............... 53/576 |

FOREIGN PATENT DOCUMENTS

| | | |
|---|---|---|
| 2135955 | 9/1984 | United Kingdom . |
| 9107867 | 6/1991 | WIPO ......................... 53/567 |

*Primary Examiner*—John Sipos
*Assistant Examiner*—Daniel Moon
*Attorney, Agent, or Firm*—Robert L. Harrington

[57] ABSTRACT

A machine for sheathing bales of material such as hay, straw and the like. The machine has radially adjustable posts mounted on a polygon frame to stretch a resilient sheath for the free insertion of the bales. The polygon frame is configured with vertical sides that closely conform to the width dimension of the largest sheath in its stretched condition. The machine width is dictated by the frame width, i.e., the distance between the vertical sides and accordingly the machine has a width only as needed to accommodate the designated bale size, the restricted width being desirable for shipping and towing. The movable posts are strategically positioned and individual cylinders are provided for opening and closing the posts for optimum utilization of the power source for the posts.

10 Claims, 4 Drawing Sheets

BALE SHEATHING METHOD AND APPARATUS

RELATED APPLICATIONS

This application is a Continuation of U.S. Ser. No. 07/882,690 now U.S. Pat. No. 5,323,591 filed May 11, 1992, which is a Continuation-In-Part of U.S. Pat. Application Ser. No. 07/760,701 (now U.S. Pat. No. 5,220,772), filed Sep. 16, 1991 by applicants herein and assigned in common to the assignee of the present invention.

BACKGROUND INFORMATION

1. Field of the Invention

This invention relates to a machine and method for sheathing bales of farm crop, e.g. hay, and particularly to features that are directed to adapting the bale sheathing concept to commercial application.

2. Background of the Invention

Protecting a harvested farm crop from the elements is beneficial to the user. Such is the case for protecting baled material such as cattle fodder. The commonly assigned co-pending U. S. Pat. Application Ser. No. 07/760,701 titled Bale Sheathing Method and Apparatus discloses a machine for inserting bales of material in a tubular resilient plastic sheath or bag.

The machine is arranged to stretch or enlarge the sheath radially to increase its opening to facilitate placement of the bales within the sheath. The sheath, which is initially open ended, is axially gathered into a ring-like configuration. The ring shaped sheath is placed on the sheathing machine with the sheath encircling a lower support pan and a series of movable posts cooperatively arranged in a circular pattern. The movable posts are mounted to a support frame which is of a circular configuration. The movable posts are strategically positioned at selected circumferentially spaced positions supported by the circular frame. The posts are mounted for radial movement by individual cylinders. Movement of the posts radially outward in conjunction with the lower support pan stretches the sheath to enlarge its opening. The sheath is, in effect, enlarged upward and laterally with respect to the lower support pan. The shape of the sheath opening is determined by the posts and assumes the shape of a polygon, with the posts residing in the corners of the polygon.

A guide structure supported on a movable carriage sequentially engages and directs a plurality of cylindrically shaped bales through the circular frame and thus into the bag or sheath. The circular frame is dimensioned to encircle the largest sheath (and the posts supporting the sheath) in its stretched condition. Since the circular frame encircles a polygon (i.e., the stretched sheath) the overall dimension of the frame is larger that the stretched sheath which establishes the overall dimensions of the machine. However, it is the polygon tunnel defined by the stretched sheath that dictates the size of the bale to be sheathed rather than the circular configuration of the support frame. In brief, the circular frame supports a polygon which envelopes a cylinder (or near cylinder) and the diameter of the frame substantially exceeds the diameter of the bales. It is desirable to have the machine reduced in overall width, more in line with the diameter of the largest bale that is being accommodated. The reduced width is desirable for shipping and for road travel between job sites.

The objective of the present invention(s) is to reduce overall width and provide a design that individually powers the movable fingers that open the bag.

BRIEF DESCRIPTION OF THE PRESENT INVENTION

In the preferred form of the invention, the supporting frames for the posts is not ring-shaped but rather is in the form of a polygon having opposed vertical sides. The polygon frame corresponds closely to the size and shape of the largest sheath in its stretched (expanded) condition. The vertical sides of the polygon frame simulate chords passing through a circle when considered in an overlay relation to the prior circular frame. The circular frame overlaid onto the polygon frame extends laterally on both sides from the vertical sides of the polygon frame and to that extent the polygon shape is substantially reduced in its width requirements for bagging the same size bale. The movable posts are strategically positioned on this polygon frame for providing the most efficient polygon configuration of the bag opening. Individual cylinders for the movable fingers optimize the available power source for opening and closing the posts.

A further improvement is embodied in the shape of the stretched sheath, i.e., the configuration of the polygon shape as determined by the pan support and posts. Previously round-baled bales were assumed to be circular and the polygon shape was designed to accommodate a circular bale. The bales, however, often sit in the field for long periods of time and through their own weight become flattened on the bottom. As the flat bottom bales are fit into the prior polygon opening (adapted for circular bales), the wider bale bottom would often catch on the bag sides. This has been avoided by designing the polygon shape with a correspondingly wider bottom opening.

The above improvements of the present invention will be more fully appreciated upon review of the detailed description and the drawings referred to therein which follow.

DESCRIPTION OF THE PREFERRED EMBODIMENT

Figure 1:
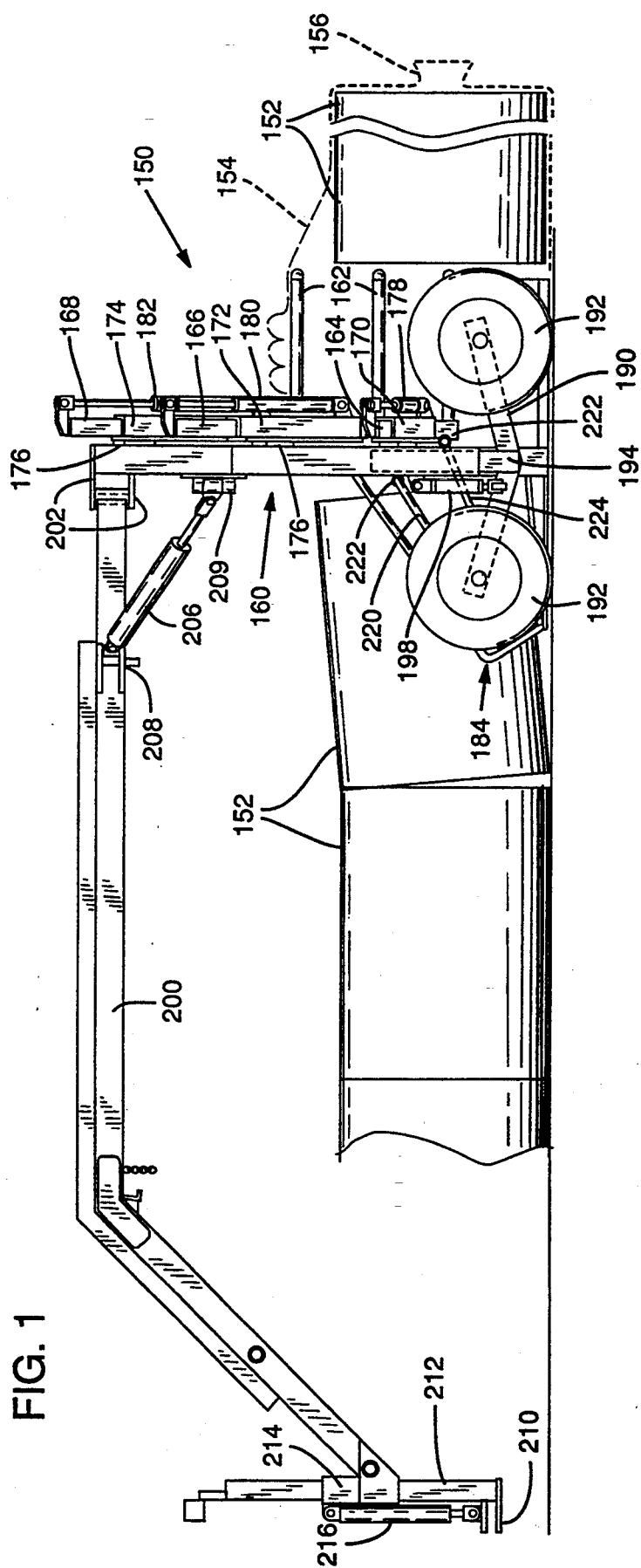
FIG. 1 is a side view of a sheathing machine of the present invention illustrating the machine in the operation of sheathing bales.

FIGS. 1–4 of the drawings illustrate an embodiment of the present invention including a sheathing machine 150 for sheathing a row of bales 152 into a tubular sheath 154. In this embodiment, the machine 150 is arranged to accommodate three different bale sizes, such as four foot, five foot and six foot bales. The machine 150 has movable fingers or posts 162 arranged on a frame 160 to expand or enlarge the opening of the sheath 154 to facilitate placement of bales 152 therein. The posts 162 in conjunction with a lower support pan 186 radially expand or stretch the sheath and thereby define a tunnel through which the bales will pass.

Figure 2:
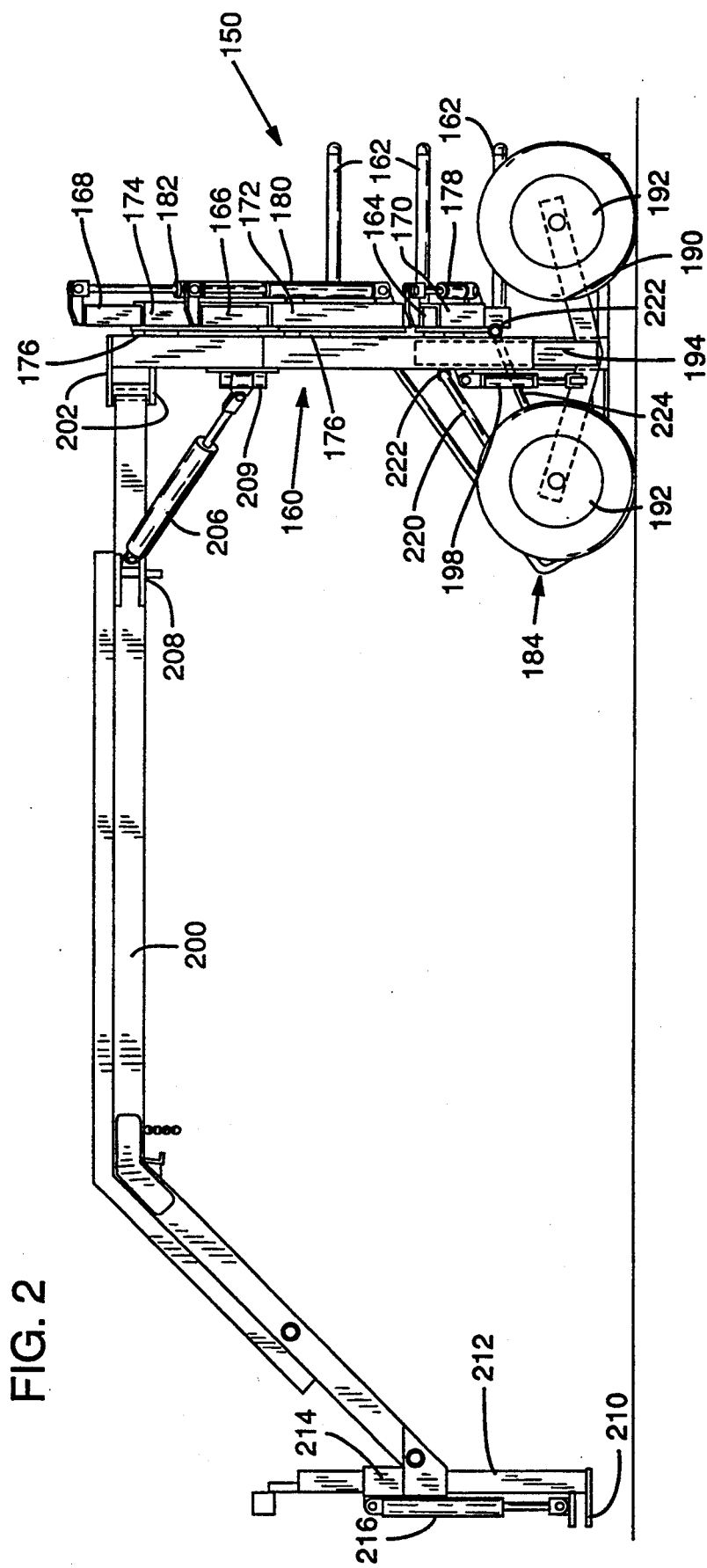
FIG. 2 is a further side view of the sheathing machine of Fig. 1 illustrating an alternative position of the machine.
Figure 4:
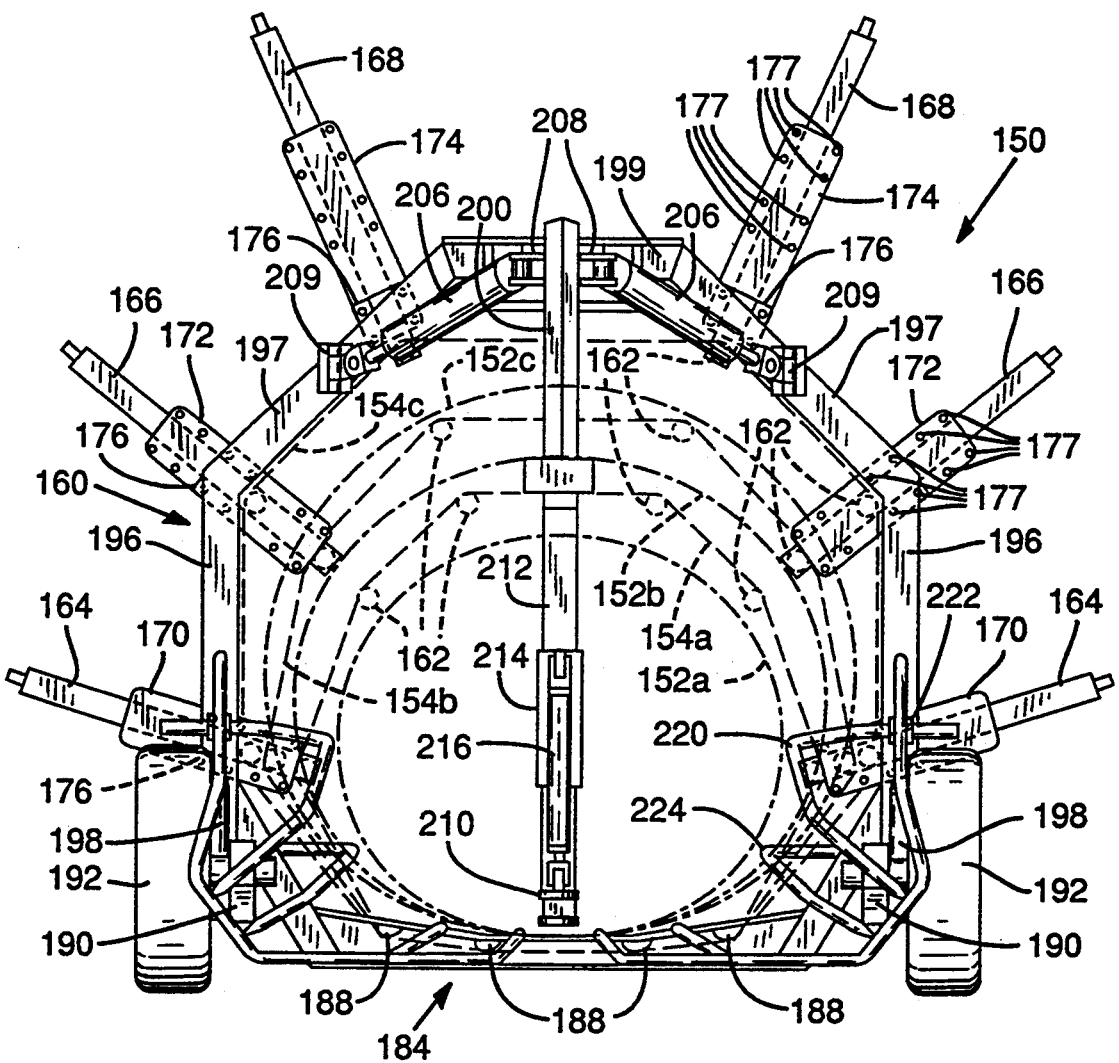
FIG. 4 is an end view of the sheathing machine of FIG. 1.

With particular reference to FIG. 4, the machine 150 has a support frame 160. Mounting brackets 176 are strategically positioned on the frame 160 for receiving the adjustable mounting of sockets 170, 172 and 174. The brackets 176 have extending studs that will mate with three different sets of four-hole patterns 177 in each of the sockets. Each socket 170, 172, 174 thus may be mounted in at least three different positions on the bracket 176. Each socket 170, 172, 174 is configured for the slidable mounting of a stretcher arm. A stretcher arm 164 is slidably mounted in each socket 170, a stretcher arm 166 is slidably mounted in each socket 172 and a stretcher arm 168 is slidably mounted in each socket 174. A post (finger) 162 is fixedly attached to the ends of each of the stretcher arms 164, 166, 168 with each post extending rearward as best seen in FIGS. 1 and 2. The stretcher arms 164, 166, 168 are moved by individual cylinders interconnected to each stretcher arm and its corresponding socket 170, 172, 174. A cylinder 178 is provided for each socket 170 and arm 164, a cylinder 180 for each socket 172 and arm 166 and a cylinder 182 for each socket 174 and arm 168. Movement of the stretcher arms will thus move the posts 162 inwardly and outwardly with respect to the center of the machine.

The machine 150 has a bale guide and elevating structure, generally indicated by numeral 184, mounted to the front of the frame 160. A lower support pan 186 of the structure 184 is extended rearward of the machine and has fixed posts 188 fixedly attached to its bottom side.

Figure 3:
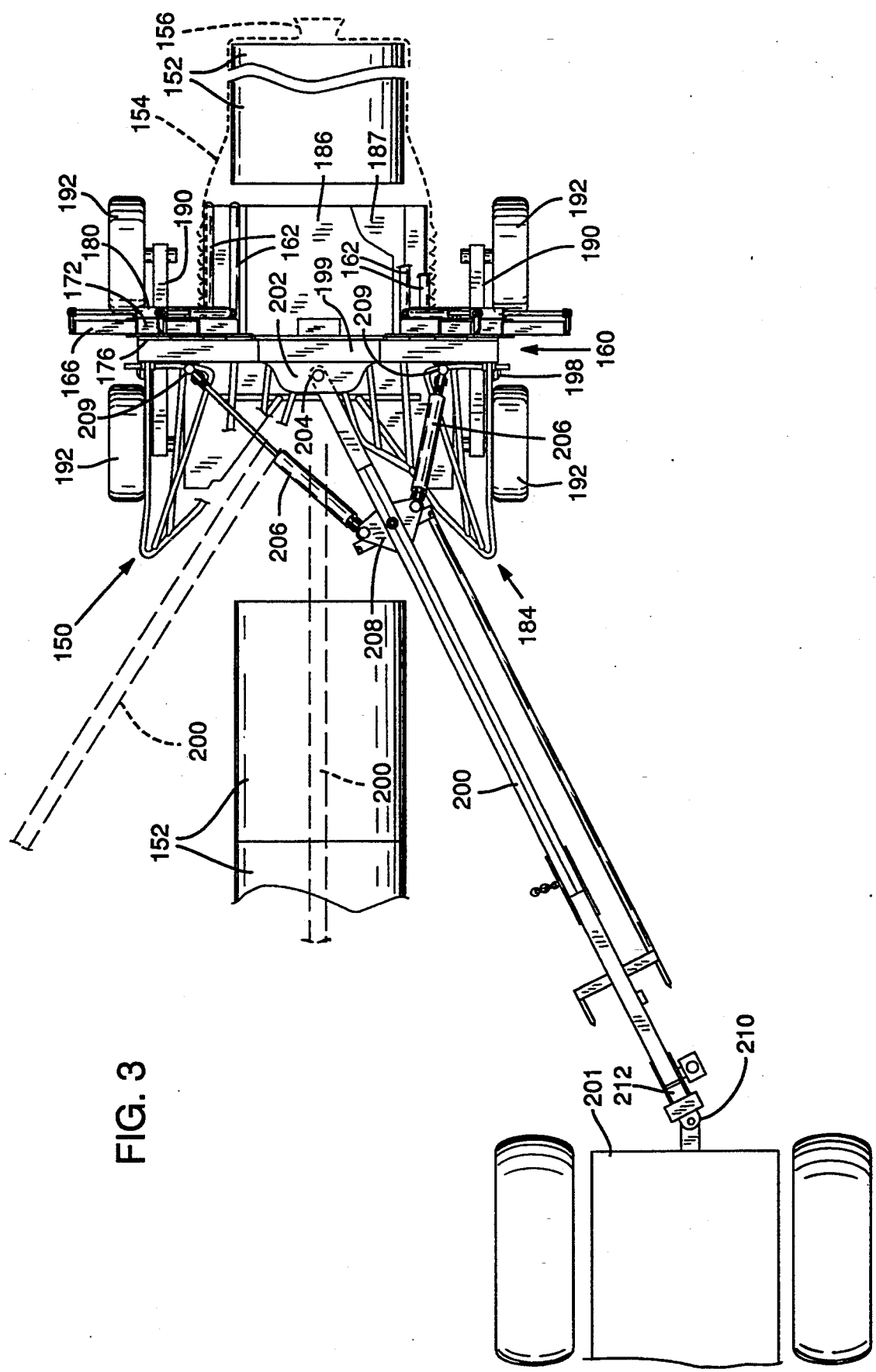
FIG. 3 is a top view of the sheathing machine of FIG. 1.

The machine 150 is adjustably supported on a carriage 190 fitted to each side of the frame 160. As shown in FIG. 1-3, the carriage has tandem wheels 192, one wheel 192 being mounted and positioned at the forward end of the carriage 190 and is thus forward of the frame 160 and the other wheel 192 being mounted and positioned at the rearward end of the carriage 190 and thus is rearward of the frame 160. A vertical strut 194 of each carriage 190 is received in a vertical side member 196 of the frame 160. The strut 194 is slidably movable in the side member 196. The frame 160 of the machine is elevated and lowered relative to the carriage 190 by a cylinder 198 interconnected to the carriage 190 and the side member 196 of the frame 160 as shown. The machine is shown in the lowered position in FIG. 1 and is shown in the elevated position in FIG. 2.

With reference to FIG. 3, the machine 150 has a swing away tow bar 200 pivotally attached to extension plates 202 extending from the upper cross member 199 of the frame 160 by a pivot pin 204. The tow bar 200 may be pivoted to either the left or the right of the machine 150 to offset the machine 150 from a towing tractor 201. The tow bar 200 may also be centrally positioned for towing from site to site. The tow bar 200 is pivoted by cylinders 206 interconnected to the tow bar and the frame 160 by suitable brackets 208 and 209. As shown in FIGS. 1 and 2, the tow bar extends forward from the top of the frame 160 and has a single bend to extend the tow bar downward for connection to a tractors hitch. The hitch 210 is adjustably mounted on the tow bar 200. The hitch 210 is mounted on the end of a shaft 212 slidably mounted in a sleeve 214. The hitch 210 is adjusted relative to the tow bar 200 by a cylinder 216 interconnected to the sleeve 214 and the shaft 212. The hitch 210 is adjusted in conjunction with the elevation or lowering of the machine 150 as illustrated in FIGS. 1 and 2.

Refer now to FIG. 4 of the drawings. The machine 150 is shown with a sheath 154 in a stretched condition for each of the bale sizes, e.g., four, five and six foot. To distinguish between each, the stretched sheath for the four foot bale will be referenced by 154a, for the five foot bale by 154b and for the six foot bale 154c. Similarly, the bale sizes are shown in dashed line, 152a representing the four foot bale, 152b the five foot bale, and 152c the six foot bale. It will be appreciated that the machine 150 is set up for sheathing one bale size at a time.

The bale guide and elevating structure 184 is shown adjusted for guiding and elevating a four foot bale 152a. The upper guide tube 220 is adjustably mounted in a collar 222 and is retained in an adjusted position by a fastener, such as a bolt in a conventional manner. The lower guide tube 224 is adjustably mounted in another collar 222. The guide tubes 220 and 224 thus may be adjusted to the size of the bale to be sheathed.

Each of the sockets 170, 172 and 174 are mountable on the brackets 176 in three different positions. For illustration, the lower sockets 170 are mounted in the position for four foot bales, the intermediate sockets 172 are mounted in the position for five foot bales and the upper sockets 174 are mounted in the position for six foot bales. It will be appreciated that the sockets would be mounted in the position corresponding to the size of the bale to be sheathed, and the mounting positions shown are for illustrative purposes.

In operation the sockets 170, 172 and 174 are mounted in a selected position dependent on the size of the bale to be sheathed. The stretcher arms 164, 166 and 168 and thus the movable posts 162 are moved radially inward toward the center of the machine for mounting the sheath. The sheath 154 is bunched or folded into a compact ring and is fitted to the machine 150 with the sheath 154 encircling the movable posts 162 and the lower support pan 186 (including fixed posts 188). A protective shield 187 is provided below the support pan 186 to prevent the sheath from engaging the ground. A sufficient length of sheathing is pulled off the posts and lower pan to form a closed end (indicated by numeral 156) of the sheath as by tieing. The stretcher arms 164, 166 and 168 are moved radially outward to stretch the sheath into the polygon configuration shown in FIG. 4.

The swing away tow bar 200 is adjusted to one side to offset the sheathing machine 150 from the tractor 201. The machine 150 is towed to a row of bales 152 with the machine aligned with the row. The machine is lowered on the carriage 190 which places the guide structure 184 very near the ground and in a position to engage the first bale 152 of the row. The machine is towed into the bale row forcing the first bale 152 to be elevated and guided through the frame 160 and the tunnel defined by the sheath 154 stretched to an enlarged opening on the movable posts 162 and the lower support pan 186. As the machine progresses down the bale row, the first bale will encounter the closed end 156 of the sheath 154 and as the bale exits the machine and is deposited on the ground a length of sheath corresponding to the length of the bale will be pulled off the machine (i.e., off the posts 162 and the lower support pan 186). The first bale which is now redeposited on the ground within the sheath acts as an anchor to pull the sheath off the machine as the machine progresses down the bale row. The bales, which are in abutment, are sequentially elevated and guided through the defined tunnel to be encased in the sheath.

The bales, which weigh hundreds of pounds each exert heavy forces on the machine. The strategic placement of the wheels 192 of each carriage 190 minimize the effect of these forces. As the guide structure 184 of the machine engages a bale, a force is applied to the structure which tends to force the structure downward, in effect attempts to tilt the machine forward. The forward wheels 192 of the carriage 190, being positioned forward of the frame 160 resists the force urging forward tilting of the machine. Similarly, as the bale nears the exit of the machine and is upon the lower support pan 186, the weight of the bale will tend to cause a rearward tilting of the machine. The rear wheel positioned rearward of the frame 160 resists the force urging the machine to tilt rearward. This is important. If the machine is allowed to tilt forward, the elevating and guide structure is likely to gouge into the ground and if the machine is allowed to tilt rearward, the elevating and guide structure will be elevated with respect to the ground and the next bale. The elevating and guide structure 184 will likely come into abutment with the next bale and prevent it from being elevated and guided into the machine.

The configuration of the support frame 160 provides a significant improvement over prior bale bagging machines. Prior designs were based on the premise that the bales were round and that the position of the bag holding posts needed to assume a substantially round shape. Thus, a circular frame was developed and the posts were projected inwardly from the frame to simulate the round shape of the bale.

However, it is impractical to provide enough posts to develop a near round bag opening. Necessarily the bag assumes a polygon shape, e.g., of four to eight sides. Nevertheless, the circular frame for supporting the posts was retained and this resulted in a circular frame surrounding a polygon shape which surrounded a round bale. The outside dimension of the frame is necessarily substantially greater than the outside dimension of the bale (because the polygon shape of the bag is formed between the two circles) and thus a bagging machine for bagging large bales, e.g., six feet in diameter, created a significant overall width problem for the machine.

Referring again to FIG. 4, the major consideration in arranging the polygon sides is the vertical sides 196 that extend from a bottom position at about the height of the bale guiding machine to a top position that is at least higher than the mid point of the largest bale that is to be accommodated. Angled sides 197 from the top of the side 196 (at about a 45 degree angle) are coupled to cross bar 199. The bale guiding structure 184 across the bottom completes the polygon shape of the frame 160.

The stretching arms 166 are positioned at the junctures of side 196 and 197. Stretching arms 164 are positioned below the mid point of the smallest bale. Positioning the posts of stretching arms 166 and 164 tightly up against side 196 defines the largest bale diameter that will fit, width-wise, inside the polygon sides 196. The remaining structure, e.g., the sides 197, 199 and stretching arms 168 are arranged relative to the width dimension between sides 196 to provide an opening that accommodates the largest sized bales.

This manner of accommodating the bag opening, i.e., the polygon frame, enables the maximum width of frame to be utilized. Accordingly, if a total frame width is determined, the maximum width bale will also be determined as the inside dimension between the side 196. Conversely, the maximum width bale will determine the maximum frame width. A secondary concern relates to the flattened bottom. The circularly arranged posts resulted in a bag opening with a bottom configuration that accommodated a common cylinder. The larger bales having a flattened bottom did not cleanly fit the bag opening and often hooked onto the sides. The flat bottom of the bales is provided for in the polygon frame of the present invention by the location and directed movement of the stretching arms 164 in association with the flat pan that is part of the bale guiding apparatus. Thus, the bag is opened so as to provide a wider bottom and avoid the loading problem.

Those skilled in the art will recognize that variations and modifications may be made without departing from the true spirit and scope of the invention. An example of such a variation is the manner of loading the bales into the bags. Whereas the preferred embodiment uses a pick up mechanism for raising bales off the ground, it is known that bales not arranged in row form can be simply sequentially placed on the guide mechanism and pushed into the bag. Also, whereas the disclosure refers to bagging of round bales it will be appreciated that the same structure can be modified to accommodate large square bales, e.g., the fingers can be positioned and controlled to stretch the bag in a square shaped opening, which of course is a polygon. The invention is therefore not to be limited to the embodiments set forth but is to be determined by the appended claims.

We claim:

1. A bale sheathing machine having a power source for sheathing bales of a designated cross-section in tubular elastically expandable bags having a non-expanded cross-section that is no greater than the bale cross-section, said machine comprising;

a bale receiving ring configured for passage therethrough of bales of compacted farm crop material, a carriage supporting said ring adapted to be moved along the ground, a bale guiding mechanism on the machine for engaging and guiding bales into and through the bale receiving ring, a plurality of fingers slidably mounted to the ring for inwardly and outwardly directed movement and arranged in a configured pattern to provide an expandable tunnel opening through the ring, a gathered tubular elastically expandable bag adapted to enclose a plurality of bales, said bag mounted onto and encircling the plurality of fingers, a plurality of cylinders for controlling the slidable movement of said fingers and the combination of cylinders controlling the slidable movement of all of said fingers, said slidable movement providing outwardly directed movement of the fingers for elastically expanding the bag opening to accommodate entry of said bales, the material of said bag and the material and configuration of said fingers cooperatively permitting resistive sliding of the bag from the fingers as the bales are directed through the ring whereby said bag collapses around said bales when pulled free of the fingers, and said plurality of cylinders adapted to be coupled to the power source to power the slidable movement of said fingers.

2. A bale sheathing mechanism as defined in claim 1 including adjusting mechanism adjusting the movable fingers to accommodate different bag sizes and different bale sizes and shapes.

3. A bale sheathing mechanism as defined in claim 2 wherein the cylinders for controlling the slidable movement of the fingers are hydraulically driven by said power source, and including a separate cylinder for each movable finger to minimize the hydraulic power requirements for expanding said expandable bags.

4. A bale sheathing machine as defined in claim 3 wherein said bale guiding mechanism in part defines the bottom portion of the tunnel opening, said inwardly and outwardly directed movement of said movable fingers being substantially radially directed from an upwardly moving center point as the bag opening is increased by the outward movement of said movable fingers for accommodating different sizes of round bales.

5. A movable bale bagging machine adapted to travel along the ground and to insert bales of a designated size and shape and having a designated width determined approximately at the mid point of the height of the bale, into an elastic bag held open by a plurality of posts, said machine comprising;
   a carriage,
   a support frame mounted on said carriage and defining an opening through which the bales are directed, said frame having outer dimensions that are determined by the size of the largest bales to be bagged, and said outer dimensions determining the width of the bagging machine,
   bale guiding structure supported by said carriage for engaging and guiding bales into and through said opening,
   a plurality of bag supporting posts, support members movably mounted on said frame, said posts mounted on said support members for movement inwardly and outwardly relative to the opening through the frame for receiving and opening an elastic bag in which the bales are to be deposited, and a power source for selective powered movement of said support members and posts carried thereby,
   said frame including a plurality of sides interconnected to form a polygon shape having a pair of opposed vertical sides, said vertical sides spaced apart a distance sufficient to accommodate the bales of said designated size and shape and defining the dimensional width of the frame, said vertical sides extending above and below the mid point of said bales, and certain of said support members positioned on said frame for movable positioning of certain of said posts to positions adjacent said vertical sides and above and below said mid point of said bales, and other of said support members positioned on said sides other than said vertical sides for positioning posts carried thereby for cooperatively receiving and forcing open the elastic bag sufficient for passage therethrough of said bales.

6. A bale bagging machine as defined in claim 5 wherein said movable members are adjustably mounted to said frame for accommodating different sized bales smaller than said bales of designated size.

7. A bale bagging machine as defined in claim 5 wherein one of said sides other than said vertical sides is a bottom side forming junctures with adjacent sides, and with posts positioned at said junctures to define a substantially horizontal reach for the opening of a bag supported thereon to accommodate bales that have a bottom side configuration that is flat.

8. A bale bagging machine as defined in claim 7 wherein said bale guiding structure includes a bale bottom support for engaging and guiding bales into and through the bale receiving ring, said structure providing a part of said polygon shape, said horizontal reach of said opening of a bag provided below said bale bottom support.

9. A bale bagging machine as defined in claim 8 wherein said vertical sides are tubular and have open bottoms, support struts telescopically supported in said vertical sides, said struts secured to said carriage and mounting said frame to said carriage.

10. A bale bagging machine as defined in claim 9 including lifting motors for telescopically lifting and lowering said tubular sides for raising and lowering the frame relative to said carriage.

* * * * *